United States Patent
Zhang et al.

(10) Patent No.: US 6,891,999 B1
(45) Date of Patent: May 10, 2005

(54) METHOD AND APPARATUS FOR PRECISION TUNING AN OPTICAL FILTER USING A BALL-END JOINT

(75) Inventors: Kevin Zhang, Santa Clara, CA (US); Ping Xie, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 124 days.

(21) Appl. No.: 09/941,474

(22) Filed: Aug. 28, 2001

Related U.S. Application Data

(63) Continuation-in-part of application No. 09/713,634, filed on Nov. 14, 2000, now Pat. No. 6,621,954, which is a continuation-in-part of application No. 09/617,736, filed on Jul. 17, 2000.

(60) Provisional application No. 60/228,908, filed on Aug. 29, 2000.

(51) Int. Cl.[7] .............................. G02B 6/26; G02B 6/42
(52) U.S. Cl. ............................. 385/31; 385/33; 385/52
(58) Field of Search ................................ 385/31–36, 52

(56) References Cited

U.S. PATENT DOCUMENTS

| 5,420,949 A | 5/1995 | Arima et al. ................ 385/43 |
| 5,689,578 A | 11/1997 | Yamauchi et al. .......... 385/123 |
| 5,949,941 A | 9/1999 | DiGiovanni ................. 385/127 |
| 6,160,933 A | 12/2000 | Laude .......................... 385/31 |
| 6,272,264 B1 * | 8/2001 | Li et al. ....................... 385/27 |
| 6,343,166 B1 * | 1/2002 | Hellman et al. .............. 385/31 |
| 6,400,876 B1 * | 6/2002 | Biscardi et al. ............. 385/120 |
| 6,430,337 B1 * | 8/2002 | Bergmann et al. ........... 385/25 |
| 6,470,120 B2 * | 10/2002 | Green et al. .................. 385/52 |
| 2002/0118920 A1 * | 8/2002 | Francis et al. ................ 385/33 |
| 2002/0118929 A1 * | 8/2002 | Brun et al. ................... 385/84 |
| 2002/0131699 A1 * | 9/2002 | Raguin et al. ................ 385/33 |
| 2003/0185519 A1 * | 10/2003 | Ushinsky ..................... 385/72 |

* cited by examiner

*Primary Examiner*—Akm Enayet Ullah
*Assistant Examiner*—Kevin S. Wood
(74) *Attorney, Agent, or Firm*—Workman Nydegger

(57) ABSTRACT

Methods and apparatus for tuning an optical element include, in one aspect, an optical element having a specified response at a predetermined location and means for redirecting incident light to a location on the optical element other than the predetermined location so as to achieve a desired response.

20 Claims, 9 Drawing Sheets

METHOD AND APPARATUS FOR PRECISION TUNING AN OPTICAL FILTER USING A BALL-END JOINT

RELATED APPLICATIONS

This application is a continuation in part of U.S. application Ser. No. 09/617,736, filed Jul. 17, 2000; which is a continuation in part of Ser. No. 09/713,634, filed Nov. 14, 2000, now U.S. Pat. No. 6,621,954. This application also claims the benefit of U.S. Provisional Application Ser. No. 60/228,908, filed Aug. 29, 2000.

BACKGROUND

1. Field

The present disclosure relates generally to fiber optics, and in particular, to a method and apparatus for precision tuning an optical element.

2. The Prior Art

Background

Optical filters formed using thin-film dielectric coatings are critical to the optical devices of today. As optical thin-film coating technologies improve, a greater array of optical filters is becoming available.

FIG. 1 shows a diagram of a prior art optical filter. Typically, optical filters are formed on a large substrate, such as substrate 100 of FIG. 1. Substrate 100 may range in diameter from a few to several centimeters, and may contain several laminates formed together to meet the desired specification. Depending on the type of laminates used, substrate 100 may range in thickness from 1 to 4 mm. Within substrate 100 several smaller dice are formed which represent individual optical filters, such as die 102 of FIG. 1. The individual die may be square, rectangular, or circular, and are typically 1–2 mm in diameter.

Manufacturers typically prepare optical filters to match a particular specification desired by a customer. One such specification is the center wavelength (CWL) of the filter. As is appreciated by those of ordinary skill in the art, the CWL is crucial to the operation of modern optical devices, such as dense wavelength division multiplexers. Customers typically specify the CWL to be within +/−50 ppm to +/−100 ppm of the ITU grid.

However, such accuracy is very difficult for optical filter manufacturers to reach, and thus the yield of dice meeting a particular CWL is typically very low. In fact, a yield as low as 5–10% is typical for a given substrate. Such a low yield has kept the price of thin-film filters relatively high.

Typically, the CWL for an optical filter is specified at the center of the filter. For example, manufacturers of devices such as thin-film filters typically specify the center wavelength only at the physical center of the filter. This is done because generally optical filters are disposed within optical devices such that light is incident at the center of the optical filter. Thus, if the customer's desired specification is not met at the center of the filter, the filter will have to be rejected.

In an effort to increase the yield of optical filters, the prior art used the well known fact that the CWL of an optical filter is dependent in the angle of incident light. If an optical filter has a CWL slightly out of specification, the optical filter may be angled to adjust the angle of incidence and thus the CWL of the filter. If the CWL was not too far out of specification, tilting the filter might bring the CWL of the filter back into specification.

However, tilting optical filters in applications such as dense wavelength division multiplexing is disfavored since the light reflected from the filter is often utilized as well as the filtered light passing through the filter. If the filter is tilted in an attempt to adjust the CWL, often the reflected light cannot be aligned correctly.

BRIEF DESCRIPTION

Methods and apparatus for tuning an optical element are disclosed. One aspect comprises an optical element having a specified response at a predetermined location and means for redirecting incident light to a location on the optical element other than the predetermined location so as to achieve a desired response.

A portion of an optical device is disclosed which may comprise a cylinder and a module having complimentary concave and convex surfaces so as to allow an optical element to be tuned to desired response.

BRIEF DESCRIPTION OF THE DRAWING FIGURES

DETAILED DESCRIPTION

Figure 1:
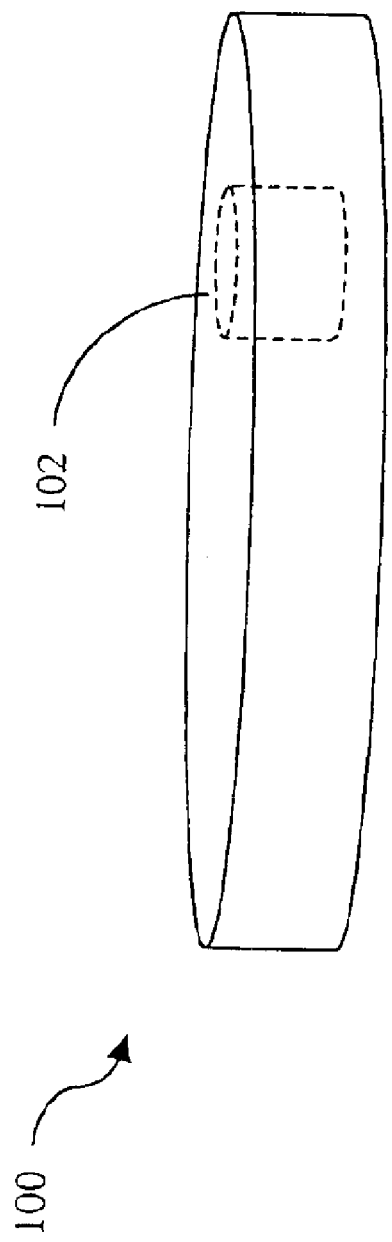
FIG. 1 is a diagram of a prior art optical filter substrate.

Persons of ordinary skill in the art will realize that the following description is illustrative only and not in any way limiting. Other modifications and improvements will readily suggest themselves to such skilled persons having the benefit of this disclosure. Like reference numerals throughout are intended to designate substantially similar matter herein.

In one aspect of the disclosure, optical elements may be utilized to tune an optical device by applying incident light to locations other than that specified by the manufacturer. For example, the center wavelength of an optical device may be changed, or tuned, by applying light to point incident on the surface of an optical element other than the center until a desired response is achieved.

Figure 2B:
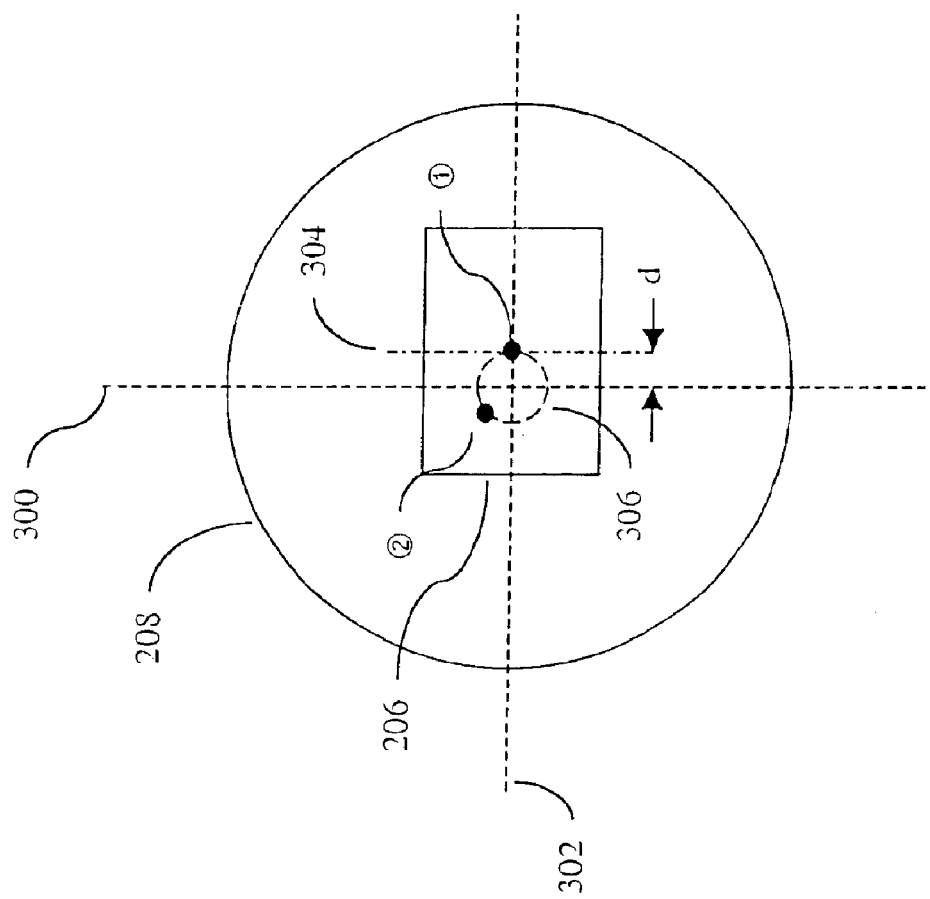
FIG. 2B is a end view of a portion of an optical device.
Figure 2A:
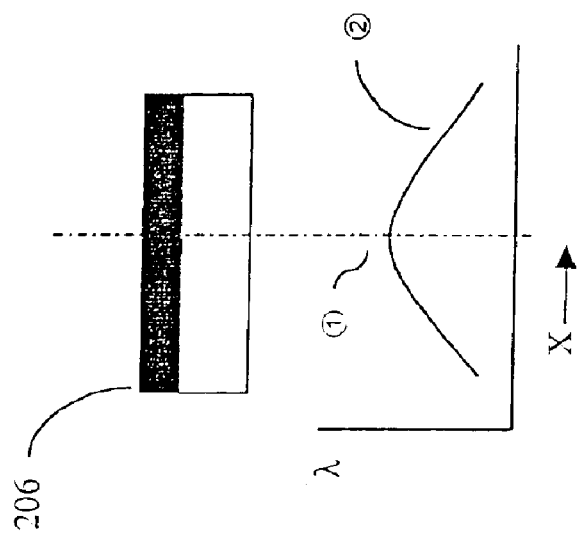
FIG. 2A is a diagram of illustrating the change in response of an optical element based on the location of an incident beam of light.

In FIG. 2A, an optical element 206 is shown over a graph showing the center wavelength at corresponding locations on the surface of the optical element. When a thin-film filter is used as the optical element, the center wavelength typically is highest (longest wavelength) at the center of the filter. As the beam location is moved away from the center, the center wavelength typically lowers. Thus, the center wavelength when measured at location 1 will typically be higher than that measured at location 2.

In FIG. 2B a module 208 is shown having axes 300 and 302 which intersect at the center of rotation of module 208. FIG. 2B further includes an optical element 206 having axes 302 and 304 which intersect at the optical element's center.

The center of optical element 206 is marked as position 1 in FIG. 2B. Optical element 206 may be positioned on module 208 such that the center 1 of the optical element 206 is offset from the center of rotation of module 208. In one aspect of a disclosed optical element, the center of optical element 206 may be offset from the center of rotation of module 208 by a distance d.

Using the structure disclosed in FIGS. 2A and 2B, a method will now be disclosed wherein the center wavelength of an optical element may be precision tuned by applying incident light to different areas of an optical element.

With the optical element 206 attached to the module 208, the module 208 may then be rotated about its center of rotation. If light is being applied to the optical element 206 while the module 208 is rotated, the incident beam of light will be incident at different locations on the surface of the optical element 206. As the module 208 is rotated about its axis, the incident beam of light will trace a path 306 on the surface of optical element 206.

As the apparatus is being rotated, the output of the optical element under test may be monitored to determine the center wavelength at a particular location. When a desired response is determined, the precise location may be noted for future use.

It is contemplated that the path 306 may be caused to trace a variety of paths or shapes. As can be seen in FIG. 2B, the applied light may be along the surface of the optical element 206 such that a circle is formed. In one aspect of the disclosed optical element, one portion of the path 306 will lie on the center of the optical element 206. However, it is contemplated that the incident light may be applied to the surface of the optical element in any desired shape to any desired location on the surface of the optical element 206 such that a desired response is obtained.

Many filters will maintain a proper response shape, even when the light is incident at a location offset from the filter's center. Thus, using the teachings of the present disclosure, a filter which previously may have been rejected as being out of specification may still be made usable by applying light elsewhere on the surface of the filter, and tuning the filter to a particular ITU grid while maintaining a proper response shape.

Throughout path 306 on the surface of optical element 206, different locations along the path 306 may have different responses, such as center wavelengths. Thus, by rotating the optical element 206 about the path 306, a predetermined response, such as a desired center wavelength, may be chosen. However, it is contemplated that any characteristic of an optical device may be tuned using the teachings of the present disclosure.

Figure 3A:
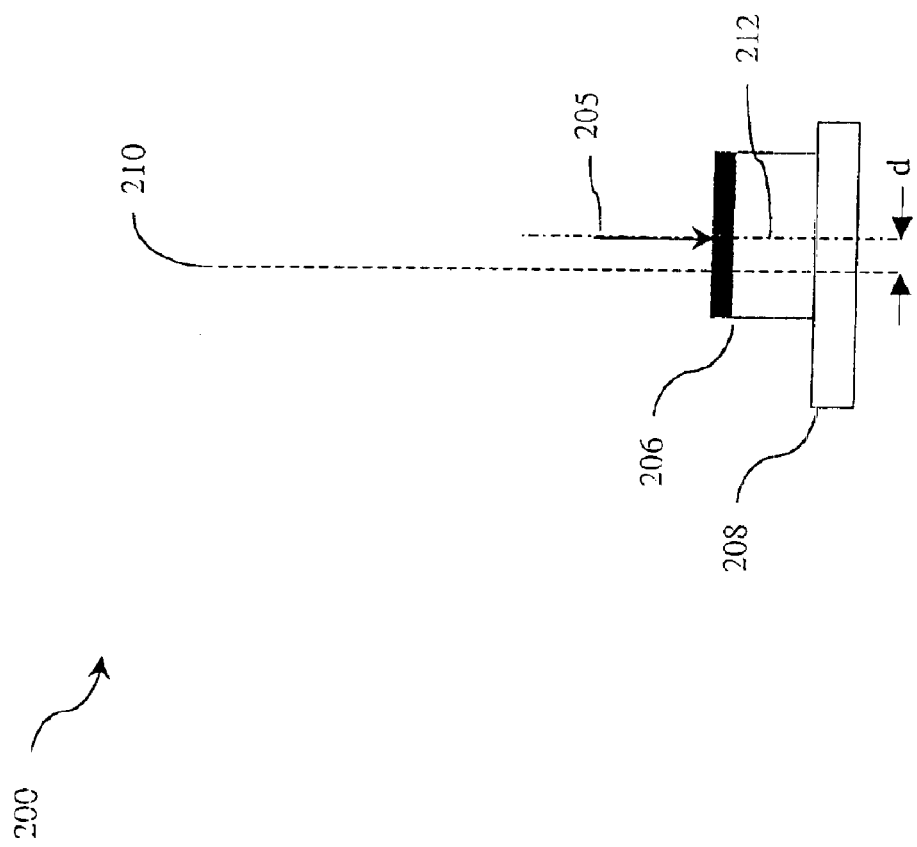
FIG. 3A is a side view of a portion of an optical device.

Referring now to FIG. 3A, an optical device 200 is shown including a module 208. Module 208 may comprise a wide variety of materials and shapes suitable for holding or securing an optical element. Module 208 may be formed about an axis 210 which defines an axis of rotation.

Device 200 further includes an optical element 206. Optical element 206 may comprise a wide variety of optical elements in the art which may be precisely aligned. Optical element 206 is further formed about an axis 212, which defines the physical or specified center of optical element 206.

Optical element 206 may be affixed to module 208 such that the axis 212 of optical element 206 is substantially parallel to, but not directly overlapping, the axis 210 of module 208. Thus, axes 210 and 212 may be separated by a distance d. Incident light 205 may be applied along axis 212 of optical element 206. Thus, the incident light 205 may be offset from the axis 210 of module 208 by a distance d.

In one aspect of a disclosed optical element, axis 212 and axis 210 may be separated by a distance of 120 μm, creating a total shift about the surface of the optical element of approximately 240 μm when rotated about a circle, yielding a tuning capability of approximately 200 pm of continuous tunability. As will be appreciated by those of ordinary skill in the art, the amount of distance d will depend on the particular application and desired tunability.

A more detailed example of means for redirecting light incident light will now be disclosed.

Figure 3B:
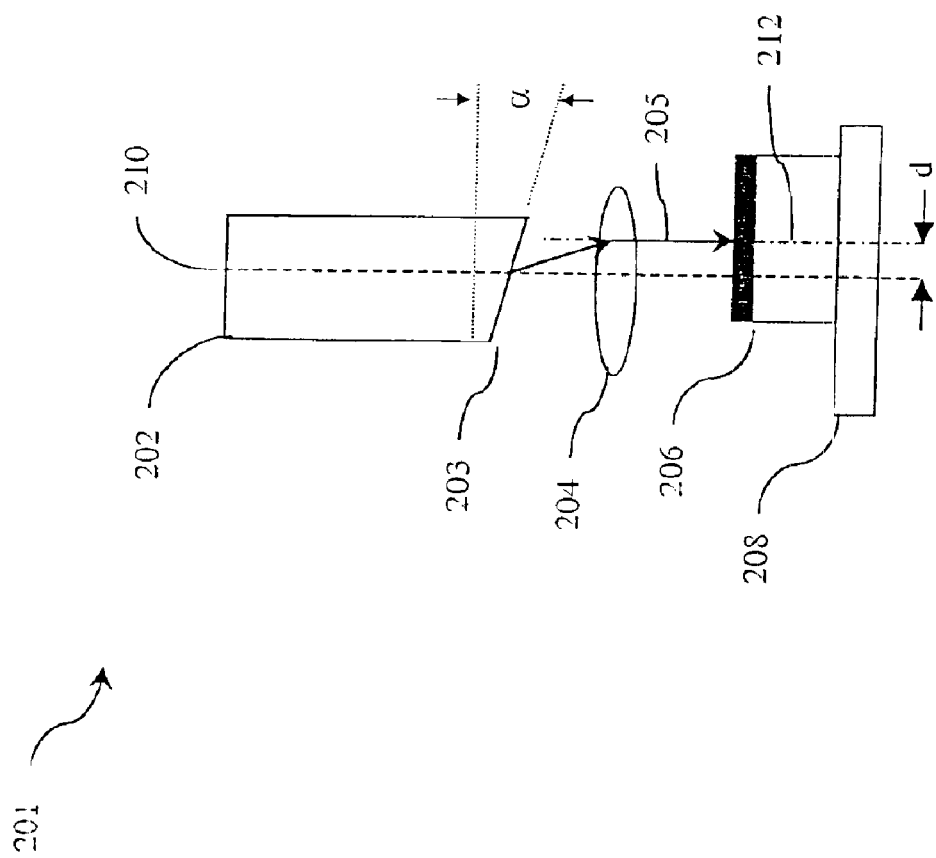
FIG. 3B is another diagram of a portion of an optical device.

FIG. 3B shows an optical device 201 including a pigtail 202 disposed along axis 210. Pigtail 202 may comprise a fiber pigtail known in the art. The pigtail 202 further includes a transmitting end 203 in which a wedge having an angle α has been formed for redirecting light at an angle. Pigtail 202 may include wedge angles standard in the art, such as 8° or 12°. However, the angle may be chosen based upon the offset distance d desired in a particular application.

A lens 204 is disposed along axis 210. Lens 210 may comprise any lens known in the art suitable to accept light incident from transmitting end 203 of pigtail 202 and direct the light a predetermined distance from axis 210. Lens 204 may be configured to align light along axis 212.

Pigtail 202 and lens 204 provide examples of means for offsetting or directing light along a predetermined path. However, it is contemplated that a wide variety of configurations are possible using optical elements known in the art to accomplish the task of directing light to predetermined offset as shown in FIG. 3B.

The disclosed optical element may be utilized wherever precise alignment and tuning of an optical element is needed. For example, any optical device that must be precisely aligned may benefit from the present disclosure. For example, any multiplexer or demultiplexer in which an optical element such as a filter must be precisely aligned will benefit from the present disclosure. Additionally, the present disclosure may be utilized with other type of optical filters, such as longpass, shortpass, and wideband, etc.

A more detailed description of an optical device suitable for tuning an optical element in accordance with the present disclosure will now be disclosed.

Figure 4:
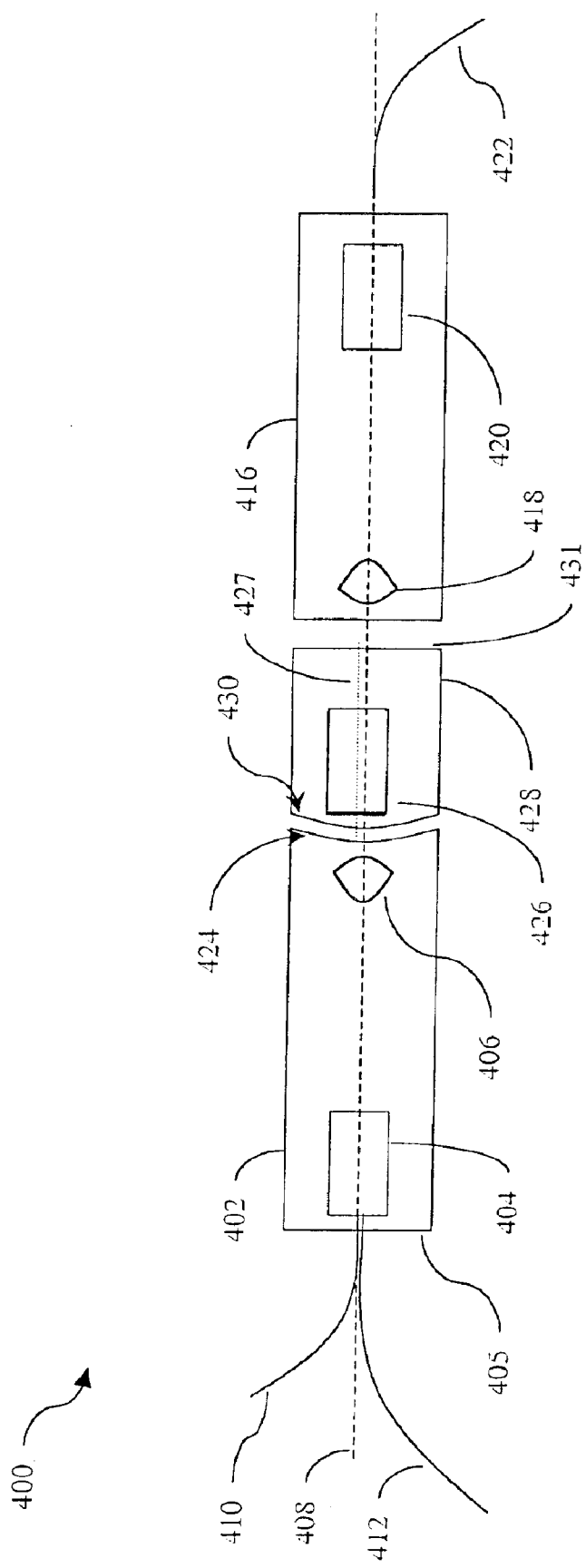
FIG. 4 is a diagram of a DWDM.

FIG. 4 shows an optical device 400 including a first collimator 402 formed in a cylindrical shape about axis 408. First collimator 402 further has a first end 405 and a second end 424. The elements of optical device 400 may be fabricated from materials known in the art, such as stainless steel.

First collimator 402 further includes a ferrule 404 comprising elements known in the art, including an incident fiber 410 optically configured to receive incident optical signals, and a reflecting fiber 412 optically configured to transmit optical signals reflected by device 400. Ferrule 404 may be disposed between first end 405 and second end 424 along axis 408.

First collimator 402 further includes a lens 406 disposed between first end 405 and second end 424 along axis 408 optically coupling signals with ferrule 404. It is contemplated that many different types of lenses known in the art may be employed in the present invention, such as GRIN lenses, or aspherical lenses.

Optical device 400 further includes a filter module 428. Filter module 428 is preferably formed in a cylindrical shape about axis 408, and has a first end 430 and a second end 431. Filter module 428 includes a thin-film filter 426 disposed between first end 430 and second end 431 about an axis 427 which is offset from axis 408. It is contemplated that wide variety of optical elements known in the art may be employed in the present invention, such as GRIN lenses, spherical or aspherical lenses, band pass filters, long or short pass filters, or selective filters. Filter 426 is disposed proximate to first end 430 and is configured to optically coupled signals with lens 406. Additionally, means for redirecting the path of incident light may disposed proximate to filter 426 as described above.

Optical device 400 includes a second collimator 416, which is preferably formed in a cylindrical shape about axis 408. Second collimator 416 further includes a ferrule 420 comprising elements standard in the art, including a transmitting fiber 410 optically configured to couple optical signals to device 400. Ferrule 404 may be disposed within ferrule 420 along axis 408.

Device 400 further includes a lens 418 disposed along axis 408 and configured to optically couple signals with filter module 428. Lens 418 may comprise an aspherical lens as described above.

As mentioned above, the alignment and securing of filter 426 is critical to the operation of an optical device. The present disclosure provides a novel and useful solution which allows the precise placement and alignment of filter 426. As can be seen by inspection of FIG. 4, the second end 424 of first collimator 402 is formed so as to define a segment of an inward-facing concave spherical surface. Likewise, first end 430 of filter module 428 is formed so as to define a segment of an outward-facing convex spherical surface, with the convex surface being complimentary in shape to the concave surface. The concave and convex surfaces allow an optical element, such as a filter, to be rotated with respect to the center of rotation, thereby applying light to different locations on the surface of the optical element. By so rotating the module, the response of the optical element may precisely tuned.

Figure 5:
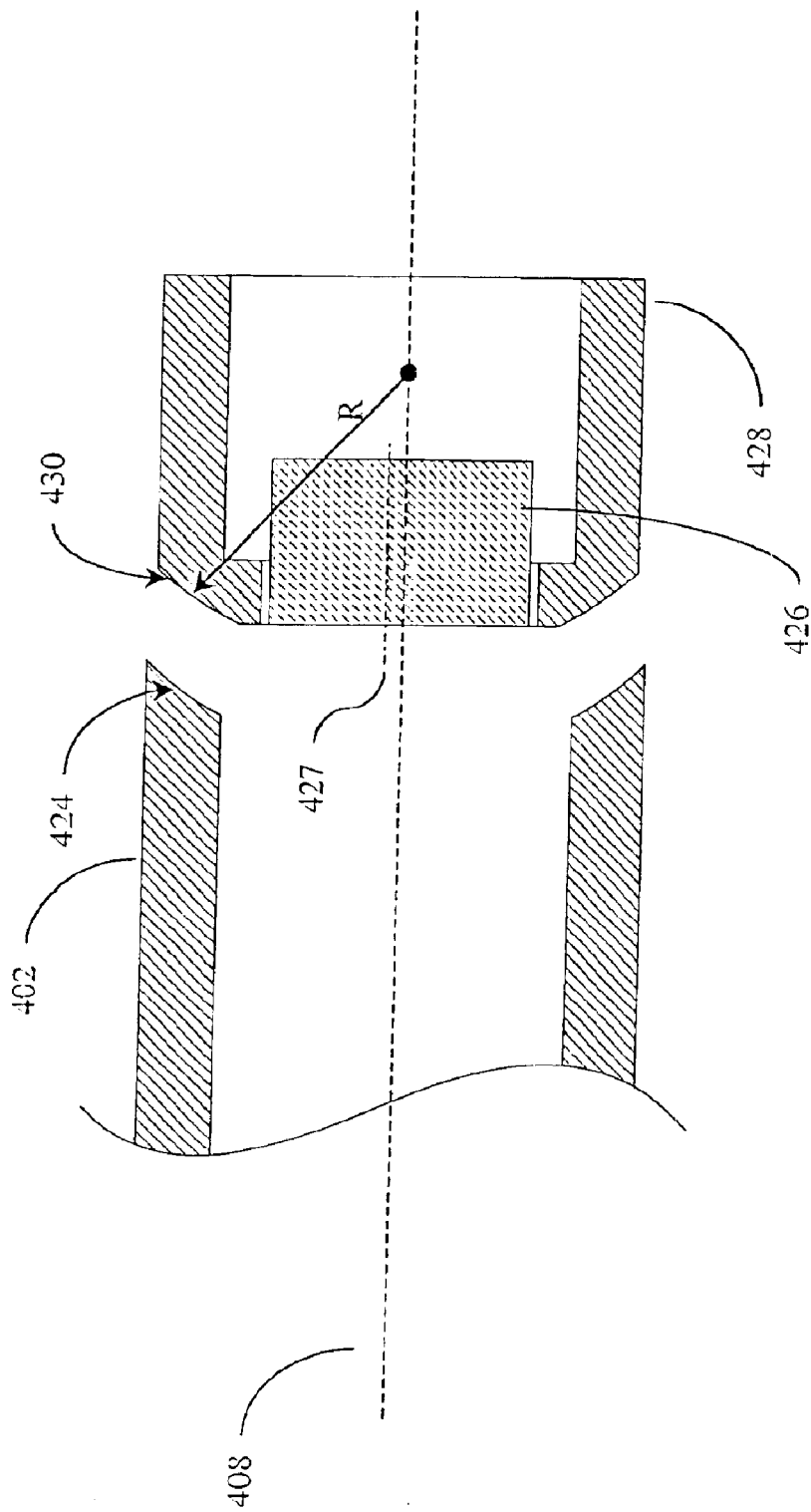
FIG. 5 is a detailed cross section diagram of a portion of an optical device.

FIG. 5 is a detailed cross-sectional diagram of a portion of an optical device focusing on the concave and convex surfaces. FIG. 5 shows the second end 424 of first collimator 402, and the first end 430 of filter module 428. FIG. 5 shows filter 426 disposed within second end 430 about an axis 427 which is offset from axis 408. The material which forms the cylinder of first collimator 402 has been removed at second end 424 to form segments of an inward-facing spherical surface having a radius of R, and the material which forms the walls of filter module 428 at first end 430 has been removed to form segments of an outward-facing spherical surface having a radius of R.

Figure 6:
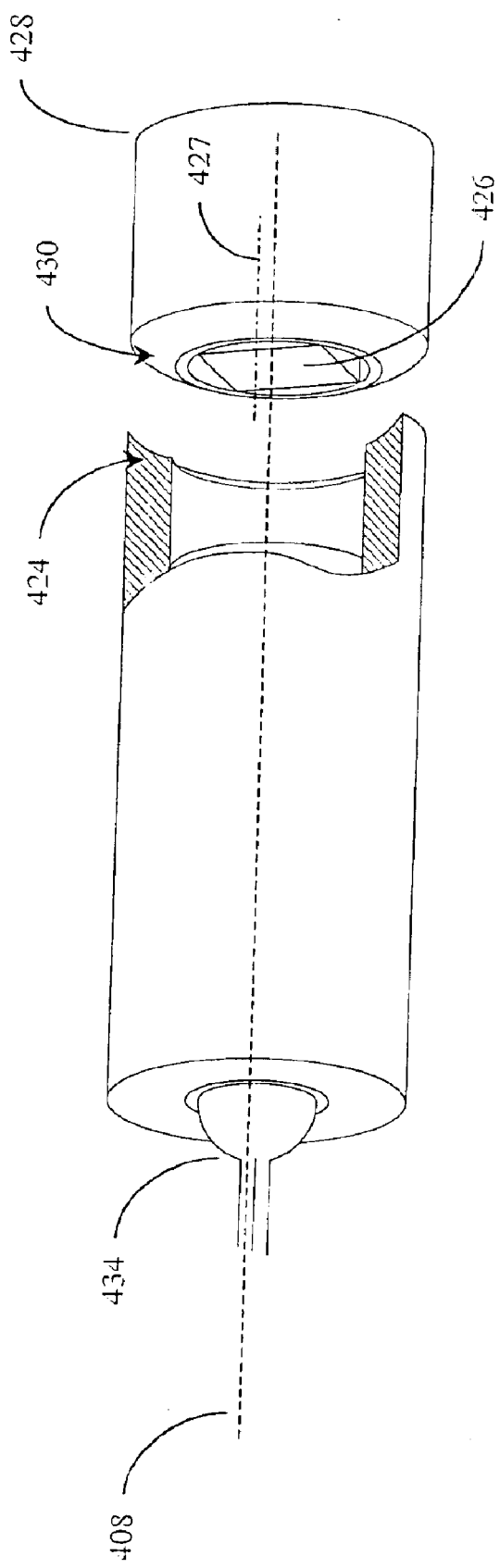
FIG. 6 is an isometric diagram of a portion of an optical device.

Referring now to FIG. 6, an isometric view of a portion of an optical device is shown, looking towards the first end of filter module 428 along axis 408, and includes a cross section taken through second end 424 of first collimator 402. FIG. 6 also shows a ferrule 434 emanating from first collimator 402. Ferrule 434 may include incident fiber 410 and reflecting fiber 412. FIG. 6 also includes filter 426 disposed along axis 427, which is offset from axis 408.

FIG. 6 also shows how the material which forms the cylinder walls of first collimator 402 has been removed at second end 424 to form segments of an inward-facing spherical surface, and how the material which forms the walls of filter module 428 at first end 430 has been removed to form segments of an outward-facing spherical surface. The isometric view of FIG. 6 also shows how the complimentary surfaces of the filter module and collimator allow the two to be mated.

Figure 7:
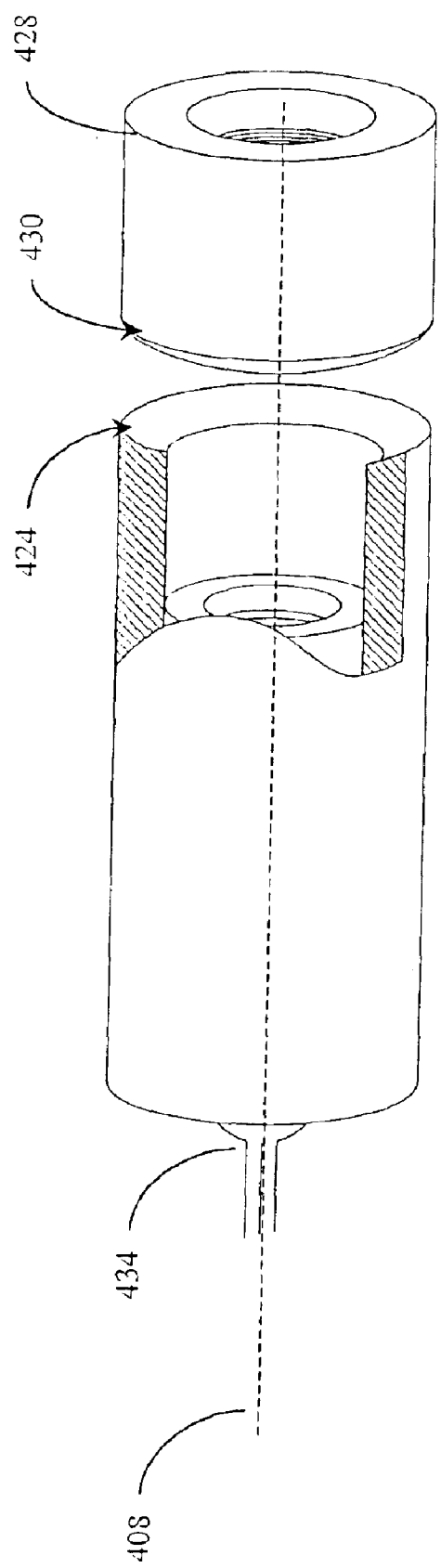
FIG. 7 is an isometric diagram of a portion of an optical device.

Referring now to FIG. 7, an isometric view of a portion of an optical device is shown, looking towards the second end of first collimator 402 along axis 408. FIG. 7 also includes a cross section taken through second end 424 of first collimator 402. FIG. 7 also shows a ferrule 434 emanating from first collimator 402.

FIG. 7 again shows how the material which forms the cylinder walls of first collimator 402 has been removed at second end 424 to form segments of an inward-facing spherical surface. Likewise, as can be seen by inspection of FIG. 7, the material which forms the walls of filter module 428 at first end 430 has been removed to form segments of an outward-facing spherical surface, allowing the complimentary surfaces of the filter module and collimator to be mated.

Figure 8:
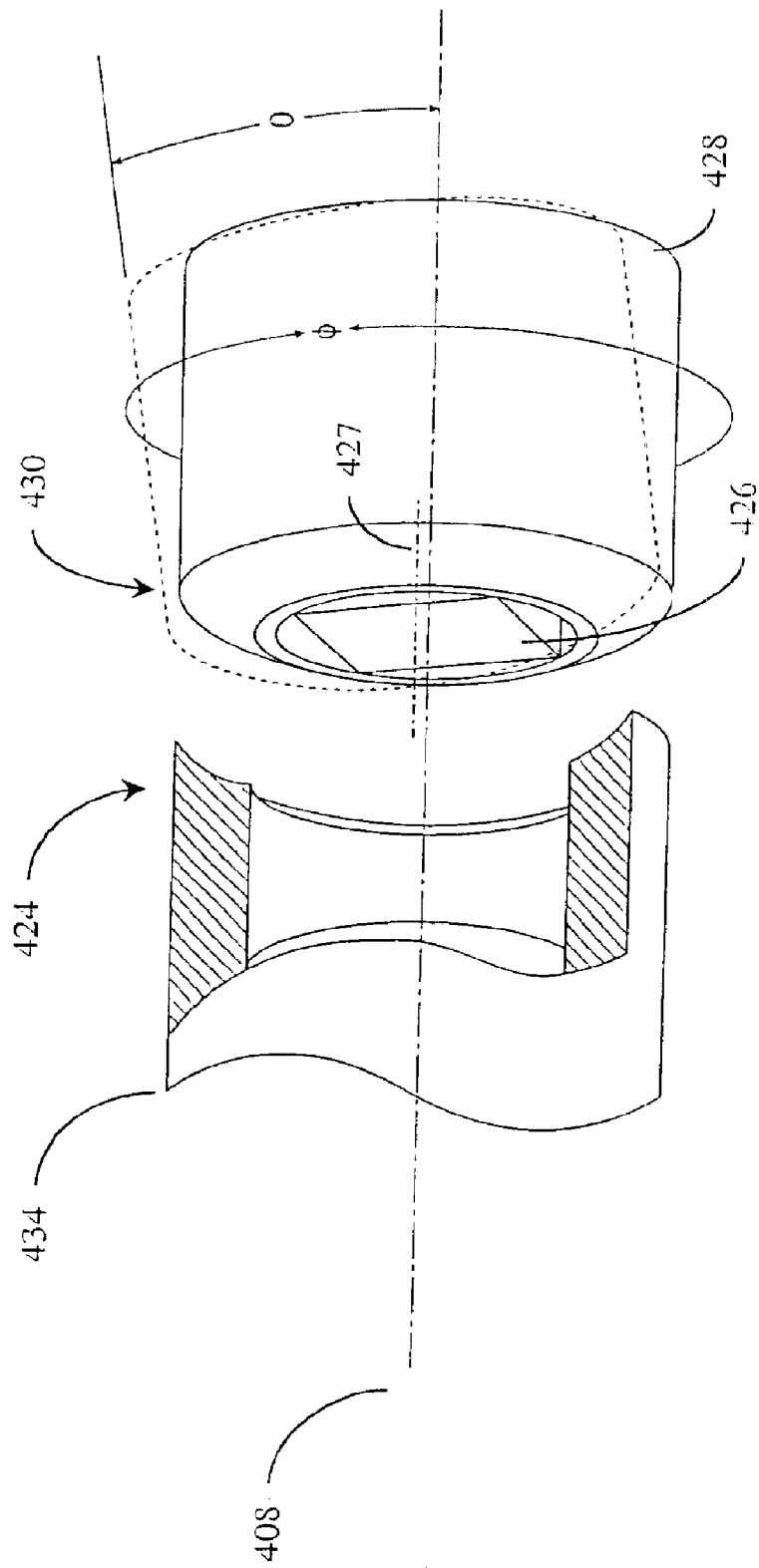
FIG. 8 is a detailed isometric diagram of a portion of an optical device.

Referring now to FIG. 8, an isometric view of an optical device is shown including a cross section of the first collimator 402, illustrating the operational advantages of the present invention.

FIG. 8 again shows how the material which forms the cylinder walls of first collimator 402 has been removed at second end 424 to form segments of an inward-facing spherical surface. Likewise, as can be seen by inspection of FIG. 8, the material which forms the walls of filter module 428 at first end 430 has been removed to form segments of an outward-facing spherical surface. The isometric view of FIG. 8 also shows how the complimentary surfaces of the filter module and collimator allow the two to be mated. FIG. 8 also includes filter 426 disposed along axis 427, which is offset from axis 408.

During manufacturing, it is contemplated that module 428 will be placed in a jig with its first end 430 facing upwards. Then, the first collimator 402 may be placed over module 428 with second end 424 facing downward. Thus, first end 430 of filter module 428 is mated with the second end 424 of first collimator 402 where the two may be moved relative to each other while still maintaining surface-to-surface contact. The operator may then precisely align the filter 426 by sliding the filter module 428 within the ball-end joint formed by the complimentary surfaces of first end 430 and second end 424 and choose a center wavelength.

As mentioned above, the alignment of filter 426 is critical to the operation of optical devices. As can be seen by inspection of FIG. 8, the face of filter 426 forms a plane which intersects axis 408. Thus, the face of filter 426 is afforded two degrees of freedom while still maintaining surface-to-surface contact. Thus, the plane formed by the face of filter 426 may be aligned with respect to axis 408 at a predetermined angle.

More specifically, filter module 428 may be rotated about axis 408 by an angle $\phi$. By rotating filter module 428 about axis 408, the optical element disposed within the filter module along an axis 427 will have incident light strike different locations on its surface, thereby tuning an optical element. This ability to maneuver the filter 426 is a significant advance over prior art devices.

It is contemplated that wide variety of optical elements known in the art may be employed, such as band pass filters, long or short pass filters, or selective filters. It is contemplated that the present disclosure may be useful in applications such as DWDM applications where the center wavelength is critical, and optical beam splitters, where the band splitting wavelength is critical. Therefore, the present disclosure should not be limited by the type of optical element employed.

While embodiments and applications of this disclosure have been shown and described, it would be apparent to those skilled in the art that many more modifications than mentioned above are possible without departing from the inventive concepts herein. The disclosure, therefore, is not to be restricted except in the spirit of the appended claims.

What is claimed is:

1. An apparatus for tuning an optical element, the apparatus comprising:
a filter module that contains a thin-film filter having a specified response at a first location and a second response at a second location, wherein a first end of the filter module has a convex surface configured to fit with a concave surface of a second optical module, wherein the thin-film filter has an axis that is offset from a center of rotation of the filter module such that either the specified response or the second response of the thin film filter can be selected as the filter module is rotated about the center of rotation; and
a mechanism for redirecting incident light to a second location on the filter module so as to achieve the second response other than said specified response.

2. The apparatus of claim 1, wherein said specified response comprises a center wavelength of said thin-film filter.

3. The apparatus of claim 1, wherein said redirecting mechanism comprises a pigtail having a wedge in a transmitting end of said pigtail.

4. The apparatus of claim 3, wherein said wedge comprises an angle between approximately 8° and 12°.

5. The apparatus of claim 1, wherein said incident light is redirected along a path offset from an axis formed by the center of rotation of said filter module.

6. An apparatus for tuning an optical element, the apparatus comprising:
a module having a center of rotation and an end having a concave surface;
an optical element being affixed to said module such that an axis of said optical element is offset from said center of rotation of said module, wherein said optical element has an end having a convex surface that fits with the concave surface of the module such that the optical element can be rotated about said center of rotation of said optical element while maintaining contact between the convex surface of the optical element and the concave surface of the module, wherein said axis of said optical element enables light to be directed to one or more locations on said optical element as said optical element rotates about said center of rotation of the module; and
a mechanism for redirecting light, said mechanism including a pigtail having a wedge formed in a transmitting end, wherein said redirecting mechanism redirects incident light to a particular location on said optical element.

7. The apparatus of claim 6, wherein said wedge comprises an angle between approximately 8° and 12°.

8. The apparatus of claim 6, wherein said particular location on said optical element is a location other than said axis of said optical element.

9. The apparatus of claim 6, wherein said particular location is selectable so as to produce a desired response from said optical element.

10. The apparatus of claim 6, wherein said redirecting mechanism is configured to redirect light along a path is substantially parallel to and offset from said center of rotation of said module.

11. A method of tuning an optical element, the method comprising:
mating a first end of a collimator with a second end of a filter module, the filter module including a filter having a plurality of responses, wherein the first end and the second end form a ball end joint such that the filter module can move with two degrees of freedom in the ball end joint and maintain contact with the collimator and wherein the filter has an axis that is offset from a center of rotation of the filter module; and
aligning the filter module by rotating the filter module within the ball end joint about the center of rotation to select a desired response from the plurality of responses.

12. The method of claim 11, wherein aligning the filter module comprises redirecting light along a path offset from the center of rotation of said collimator.

13. A method for tuning an optical element comprising:
providing an optical element having a center of rotation;
providing a module including a filter, the filter having a plurality of responses and a center;
affixing an end of said optical element to an end of said module such that said center of said filter is offset from said center of rotation of said optical element, wherein the end of the optical element has a concave surface that fits with a convex surface of the end of the module to form a ball end joint between the optical element and the module;
applying incident light to said optical element, said incident light traveling along a path offset from said center of rotation; and
selecting a predetermined response by performing at least one of (a) rotating said module about said center of rotation and (b) adjusting a plane formed by a face of the filter with respect to the center of rotation by sliding the module within the ball end joint until the predetermined response is achieved.

14. The method of claim 13, wherein said act of rotating including the act of selecting one of said plurality of responses as the predetermined response.

15. An apparatus for tuning an optical element comprising:
module means for rotating about a center of rotation;
optical means including a filter, supported by said module means, for responding to an incident light and producing a plurality of responses, said optical means having a predetermined response at a position offset from said center of rotation, wherein an end of the module means forms a ball end joint with an end of the optical means such that the filter can be moved with respect to the center of rotation while maintaining contact between the optical means and the module means;
means for applying incident light to said optical means, said incident light traveling along a path offset from said center of rotation; and
means for rotating said module about said center of rotation until a desired response from said optical means to said incident light is achieved.

16. A method for tuning an optical element comprising:
applying an incident light beam from a source to a first location on an optical element having a specified response to the light beam at the first location, the optical element having an end to form a ball end joint with the source, the first location offset from a center of rotation of the source; and positioning the optical element by at least rotating the optical element about the center of rotation using the ball end joint so that the light beam is incident at a second location on the optical element having a desired response other than the specified response.

17. The method of claim 16, wherein the optical element comprises a filter.

18. The method of claim 17, wherein the specified response comprises a center wavelength of the filter.

19. An optical element that can be tuned to a particular response, the optical element comprising:

a filter having a plurality of responses to an incident light beam, the filter having a face;

a housing that contains the filter, wherein the filter is positioned within the housing such that a center of the filter does not coincide with a center of rotation of the housing such that the incident light beam can be incident on a plurality of locations of the filter as the housing rotates about the center of rotation, the housing having a convex shaped end that forms a joint with a light source having a concave shaped end such that the filter can be rotated about a center of rotation of the light source and such that the face of the filter can be tilted with respect to the light source, wherein the center of rotation of the light source substantially coincides with the center of rotation of the housing.

20. An optical element as defined in claim 19, wherein the light source is a collimator and the joint is a ball end joint.

* * * * *